(12) United States Patent
Erhart et al.

(10) Patent No.: US 7,949,106 B2
(45) Date of Patent: *May 24, 2011

(54) ASYNCHRONOUS EVENT HANDLING FOR VIDEO STREAMS IN INTERACTIVE VOICE RESPONSE SYSTEMS

(75) Inventors: George William Erhart, Loveland, CO (US); Valentine C. Matula, Granville, OH (US); David Joseph Skiba, Golden, CO (US)

(73) Assignee: Avaya Inc., Basking Ridge, NJ (US)

( * ) Notice: Subject to any disclaimer, the term of this patent is extended or adjusted under 35 U.S.C. 154(b) by 1386 days.

This patent is subject to a terminal disclaimer.

(21) Appl. No.: 11/188,542

(22) Filed: Jul. 25, 2005

(65) Prior Publication Data

US 2007/0036293 A1 Feb. 15, 2007

Related U.S. Application Data

(60) Provisional application No. 60/660,249, filed on Mar. 10, 2005.

(51) Int. Cl.
*H04M 11/06* (2006.01)
(52) U.S. Cl. ............... 379/88.16; 379/88.01; 379/88.13; 379/88.19; 379/88.22; 348/14.01; 704/260; 704/270.1; 709/226
(58) Field of Classification Search ............... 379/88.16, 379/88.18, 265.09, 201.04, 88.01, 201.12, 379/212.01, 266.01, 88.02, 88.13, 88.19, 379/88.2; 455/445, 466; 709/229, 223, 224, 709/249, 214, 226; 715/733, 853, 234, 744; 348/14.01; 704/260, 270.1
See application file for complete search history.

(56) References Cited

U.S. PATENT DOCUMENTS

| | | | |
|---|---|---|---|
| 5,506,954 A | 4/1996 | Arshi et al. | |
| 5,737,393 A | 4/1998 | Wolf | |
| 5,764,278 A | 6/1998 | Nagao | |
| 5,878,117 A * | 3/1999 | Minakami et al. | 379/88.01 |
| 5,915,001 A | 6/1999 | Uppaluru | |
| 6,012,089 A | 1/2000 | Hasegawa | |
| 6,038,293 A * | 3/2000 | McNerney et al. | 379/88.19 |
| 6,427,002 B2 * | 7/2002 | Campbell et al. | 379/88.01 |
| 6,487,277 B2 | 11/2002 | Beyda et al. | |
| 6,493,433 B2 * | 12/2002 | Clabaugh et al. | 379/88.13 |
| 6,496,567 B1 * | 12/2002 | Bjornberg et al. | 379/88.02 |

(Continued)

OTHER PUBLICATIONS

Di Fabbrizio G. et al, "Unifying conversational multimedia interfaces for accessing network services across communication devices", Multimedia and Expo, ICME 2000, IEEE International conference on New York, NY, USA 30 Jul. 30-Aug. 2, 2000, Piscataway, NJ, USA, vol. 2, Jul. 30, 2000, pp. 653-656, XP010513097 ISBN: 0-7803-6536-4.

(Continued)

*Primary Examiner* — Gerald Gauthier
(74) *Attorney, Agent, or Firm* — DeMont & Breyer, LLC

(57) ABSTRACT

A method and apparatus are disclosed for enabling an interactive voice response (IVR) system to deliver a video stream to a telecommunications terminal and handle events related to the video stream. In particular, the illustrative embodiment overcomes two disadvantages of the prior art. First, the illustrative embodiment enables events to be generated and caught by a script of an IVR system at any time during a call. Second, the illustrative embodiment enables events to be handled in parallel with the execution of a script of the IVR system, thereby enabling the performing of actions response to a stream-related event without halting or interfering with other tasks of the IVR script.

18 Claims, 7 Drawing Sheets

U.S. PATENT DOCUMENTS

| | | | | |
|---|---|---|---|---|
| 6,567,854 | B1 * | 5/2003 | Olshansky et al. | 709/229 |
| 6,570,606 | B1 | 5/2003 | Sidhu et al. | |
| 6,587,822 | B2 | 7/2003 | Brown et al. | |
| 6,631,186 | B1 * | 10/2003 | Gibson et al. | 379/201.12 |
| 6,677,968 | B1 * | 1/2004 | Appelman | 715/853 |
| 6,691,162 | B1 * | 2/2004 | Wick | 709/224 |
| 6,714,793 | B1 * | 3/2004 | Carey et al. | 455/466 |
| 6,728,357 | B2 * | 4/2004 | O'Neal et al. | 379/201.04 |
| 6,735,193 | B1 | 5/2004 | Bauer et al. | |
| 6,750,881 | B1 * | 6/2004 | Appelman | 715/733 |
| 6,848,008 | B1 * | 1/2005 | Sevanto et al. | 709/249 |
| 6,904,143 | B1 | 6/2005 | Peterson et al. | |
| 6,989,856 | B2 | 1/2006 | Firestone et al. | |
| 7,062,709 | B2 * | 6/2006 | Cheung | 715/234 |
| 7,142,661 | B2 * | 11/2006 | Erhart et al. | 379/265.09 |
| 7,164,762 | B2 * | 1/2007 | Hanson et al. | 379/212.01 |
| 7,277,855 | B1 * | 10/2007 | Acker et al. | 704/260 |
| 7,284,201 | B2 | 10/2007 | Cohen-Solal | |
| 7,349,700 | B1 * | 3/2008 | Goldfinger | 455/445 |
| 7,433,954 | B2 * | 10/2008 | Dolinar et al. | 709/226 |
| 7,471,776 | B2 | 12/2008 | Volkommer et al. | |
| 7,512,698 | B1 | 3/2009 | Pawson | |
| 7,689,426 | B2 * | 3/2010 | Matula | 704/270.1 |
| 7,702,083 | B2 * | 4/2010 | Erhart et al. | 379/88.22 |
| 7,711,095 | B2 * | 5/2010 | Erhart et al. | 379/88.13 |
| 7,769,148 | B2 * | 8/2010 | Erhart et al. | 379/88.22 |
| 7,847,813 | B2 * | 12/2010 | Erhart et al. | 348/14.01 |
| 2002/0198719 | A1 | 12/2002 | Gergic et al. | |
| 2003/0026409 | A1 | 2/2003 | Bushey et al. | |
| 2004/0071275 | A1 | 4/2004 | Bowater et al. | |
| 2004/0073643 | A1 * | 4/2004 | Hayes et al. | 709/223 |
| 2004/0218737 | A1 * | 11/2004 | Kelly | 379/88.18 |
| 2005/0038876 | A1 * | 2/2005 | Chaudhuri | 709/219 |
| 2005/0047556 | A1 * | 3/2005 | Somerville et al. | 379/9.01 |
| 2005/0104909 | A1 | 5/2005 | Okamura et al. | |
| 2005/0141694 | A1 * | 6/2005 | Wengrovitz | 379/265.09 |
| 2005/0254440 | A1 | 11/2005 | Sorrell | |
| 2005/0276399 | A1 | 12/2005 | Thompson | |
| 2006/0064729 | A1 | 3/2006 | Steading | |
| 2006/0282783 | A1 * | 12/2006 | Covell et al. | 715/744 |
| 2007/0230683 | A1 * | 10/2007 | Brown et al. | 379/266.01 |
| 2008/0056456 | A1 * | 3/2008 | Erhart et al. | 379/88.01 |

OTHER PUBLICATIONS

Jennifer L. Beckham et al, "Towards SMIL as a Foundation for Multimodal, Multimedia applications", Eurospeech 2001, European conference on speech communication and technology, vol. 2, Sep. 7, 2001, pp. 1363-1366, XP007004600.

Morales, I., "VoiceXML, CCXML, SALT. Architectural tools for enabling speech applications", XML journal [Online] vol. 3, No. 9, 2002, XP002426773 retrieved from the internet: URL:http//xml.syscon.com/read/40476_p.htm> [retrieved on Mar. 26, 2007].

Auburn R J (Editor), "Voice browser call control: CCXML version 1.0—W3C working draft Jan. 11, 2005", W3C, Jan. 11, 2005, XP002397221, paragraph [7.2.2.1], paragraph [09.1], Appendix D—VoiceXML 2.0 Integration Details.

Intel Corporation, "VoiceXML Solution from VoiceGenie and Intel Delivers Open, Standards-Based Voice Services Platform" [Online] Jun. 2004, pp. 1-8, XP002397222, Retrieved from the Internet: URL:http://download.intel.com/network/csp/pdf/9127wp.pdf> [retrieved on Aug. 31, 2006].

Hewlett-Packard Company, "HP OpenCall Media Platform—Browser Runtime Environment—Installation and Configuration Guide—For OCMP Release 2.4—Second Edition" [Online] 2004, pp. 1-60, XP002397224, Retrieved from the Internet: URL:http://docs.hp.com/en/5190/Instalationand Configuration.pdf? [retrieved on Aug. 31, 2006].

Meister, "International Patent Application No. 06251246.2-25414 Examination Report", Mar. 19, 2008, Publisher: EPO, Published in: EP.

Di Fabbrizio et al., "Unifying Conversational Multimedia Interfaces for Accessing Network Services Across Communication Devices", "ICME 2000", Jul. 30, 2000, pp. 653-656, vol. 2, Publisher: IEEE International Conference on Multimedia and Expo (ICME 2000), Published in: US.

Hyam, Kristy, "CA Application No. 2537887 Office Action", Jan. 8, 2009, Publisher: CIPO, Published in: CA.

Kasthuri Mohan, "IN Application No. 413/CHE/2006 Examination Report", Nov. 25, 2008, Publisher: Government of India Patent Office, Published in: IN.

Sing, Simon P., "U.S. Appl. No. 11/235,890 Office Action Jul. 10, 2009", , Publisher: USPTO, Published in: US.

Hoque, Nafiz E., "U.S. Appl. No. 11/240,092 Office Action Jun. 11, 2009", , Publisher: USPTO, Published in: US.

Cremer, Jan, "EP Application No. 06251246.2 Search Report and Written Opinion Apr. 25, 2007", , Publisher: EPO, Published in: EP.

Hoque, Nafiz E., "U.S. Appl. No. 11/240,092 Office Action Dec. 10, 2009", , Publisher: USPTO, Published in: US.

Hoque, Nafiz E., "U.S. Appl. No. 11/240,092 Panel Decision Apr. 30, 2010", , Publisher: USPTO, Published in: US.

Hyam, Kristy, "CA Application No. 2,537,887 Office Action Jan. 27, 2010", , Publisher: CIPO, Published in: CA.

Sing, Simon P., "U.S. Appl. No. 11/235,890 Notice of Allowance Jan. 6, 2010", , Publisher: USPTO, Published in: US.

Hoque, Nafiz E., "U.S. Appl. No. 11/240,092 Office Action Aug. 5, 2010", , Publisher: USPTO, Published in: US.

El-Zoobi, Maria, "U.S. Appl. No. 11/360,256 Notice of Allowance Aug. 13, 2010", , Publisher: USPTO, Published in: US.

El-Zoobi, Maria, "U.S. Appl. No. 11/360,256 Office Action Mar. 9, 2010", , Publisher: USPTO, Published in: US.

Hoque, Nafiz E., "U.S. Appl. No. 11/240,092 Office Action Nov. 26, 2010", , Publisher: USPTO, Published in: US.

\* cited by examiner

Figure 2 (PRIOR ART)

```
<?xml version="1.0"?>
<vxml version="2.0">
<catch event="telephone.disconnected.hangup">
    <exit/>
</catch>
<catch event="nomatch">
    <prompt>I'm sorry I did not understand what you said.</prompt>
</catch>
<menu id="menu1" scope="document" dtmf="true">
    <prompt> Welcome!!!! Please choose one of the following options: <enumerate/> </prompt>
        <choice dtmf="1" next="#formSales"> Sales, </choice>
        <choice dtmf="*2" next="#formMarket"> Marketing, </choice>
        <choice dtmf="3" next="#formSupport"> Support </choice>
</menu>
<form id="formSales">
    <field name="SalesInput">
        <prompt> I will now transfer you to sales </prompt>
    </field>
</form>
<form id="formMarket">
    <field name="MarketInput">
        <prompt> I will now transfer you to marketing </prompt>
    </field>
</form>
<form id="formSupport">
    <field name="SupportInput">
        <prompt> I will now transfer you to support </prompt>
    </field>
</form>
</vxml>
```

Figure 3 (PRIOR ART)

```
<SALT:prompt xml:lang="en-US" id="ttsPrompt" onerror="DoTTSPromptError()"
oncomplete="DoTTSPromptComplete()">
    <SALT:param name="server">localhost</SALT:param>
</SALT:prompt>
<SALT:prompt xml:lang="en-US" id="videoPrompt" onmedia="DoVideoMediaEvent()"
onerror="DoVideoPromptError()" oncomplete="DoVideoPromptComplete()">
    <SALT:param name="server">videoserver</SALT:param>
</SALT:prompt>
<SALT:listen xml:lang="en-US" id="listenLine1" mode="automatic" onreco="DoASRResult()"
onnoreco="DoASRNoResult()" onerror="DoASRError()">
    <SALT:grammar src="http://localhost/salttest/menu.grxml" />
    <SALT:param name="server">localhost</SALT:param>
</SALT:listen>
</BODY>
<script id="script1" language="jscript">
<!--
    function FormLoad() {
        ttsPrompt.Start("Welcome!!! Please choose one of the following options: sales, marketing,
support");
        listenLine1.Start();
    }
    function DoTTSPromptError() {
        ... Handle TTS Prompt Error ...
    }
    function DoTTSPromptComplete() {
    }
-->
</script>
</HTML>
```

Figure 6

```
<?xml version="1.0"?>
<vxml version="2.0">
<catch event="telephone.disconnected.hangup">
    <exit/>
</catch>
<catch event="nomatch">
    <prompt>I'm sorry I did not understand what you said.</prompt>
</catch>
<catch asyncevent="media.network.congestion">
    <subdialog name="notused" src="#stopMedia"/>
</catch>
<form id="stopMedia">
    <block>
        <submit namelist="session.connection.callid" next="http://videoserver/stopMedia"/>
    </block>
</form>
<catch asyncevent="media.client.video.playdone">
    <subdialog name="notused" src="#playDone"/>
</catch>
<form id="playDone">
    <block>
        <submit namelist="session.connection.callid" next="http://videoserver/playDone"/>
    </block>
</form>
<menu id="menu1" scope="document" dtmf="true">
    <prompt> Welcome!!!! Please choose one of the following options: <enumerate/> </prompt>
        <choice dtmf="1" next="#formSales"> Sales, </choice>
        <choice dtmf="*2" next="#formMarket"> Marketing, </choice>
        <choice dtmf="3" next="#formSupport"> Support </choice>
</menu>
...
</vxml>
```

Figure 7

```
<SALT:prompt xml:lang="en-US" id="ttsPrompt" onerror="DoTTSPromptError()"
oncomplete="DoTTSPromptComplete()">
    <SALT:param name="server">localhost</SALT:param>
</SALT:prompt>
<SALT:prompt xml:lang="en-US" id="videoPrompt" onmedia="DoVideoMediaEvent()"
onerror="DoVideoPromptError()" oncomplete="DoVideoPromptComplete()">
    <SALT:param name="server">videoserver</SALT:param>
</SALT:prompt>
<SALT:listen xml:lang="en-US" id="listenLine1" mode="automatic" onreco="DoASRResult()"
onnoreco="DoASRNoResult()" onerror="DoASRError()">
    <SALT:grammar src="http://localhost/salttest/menu.grxml" />
    <SALT:param name="server">localhost</SALT:param>
</SALT:listen>
</BODY>
<script id="script1" language="jscript">
<!--
    function FormLoad() {
        ttsPrompt.Start("Welcome!!! Please choose one of the following options: sales, marketing,
            support");
        videoPrompt.Start(http://videoserver/playintro.3gp);
            listenLine1.Start();
    }
    function DoTTSPromptError() {
        ... Handle TTS Prompt Error ...
    }
    function DoTTSPromptComplete() {
    }
    function DoVideoPromptError() {
        ttsPrompt.Start("There was a video prompt error:" + event.srcElement.status);
    }
    function DoVideoPromptComplete() {
        videoPrompt.Start(http://videoserver/playdone);
    }
    function DoVideoMediaEvent() {
        var msg = event.srcElement.received;
        if(msg.nodeName == "netcongestion")videoPrompt.Stop();
    }
-->
</script>
</HTML>
```

ASYNCHRONOUS EVENT HANDLING FOR VIDEO STREAMS IN INTERACTIVE VOICE RESPONSE SYSTEMS

FIELD OF THE INVENTION

The present invention relates to telecommunications in general, and, more particularly, to handling events for video content streams in an interactive voice response system script.

BACKGROUND OF THE INVENTION

Many enterprises employ an interactive voice response (IVR) system that handles calls from telecommunications terminals. An interactive voice response system typically presents a hierarchy of menus to the caller, and prompts the caller for input to navigate the menus and to supply information to the IVR system. For example, a caller might touch the "3" key of his terminal's keypad, or say the word "three", to choose the third option in a menu. Similarly, a caller might specify his bank account number to the interactive voice response system by inputting the digits via the keypad, or by saying the digits. In many interactive voice response systems the caller can connect to a person in the enterprise by either selecting an appropriate menu option, or by entering the telephone extension associated with that person.

FIG. 1 depicts telecommunications system 100 in accordance with the prior art. Telecommunications system 100 comprises telecommunications network 105, private branch exchange (PBX) 110, and interactive voice response system 120, interconnected as shown.

Telecommunications network 105 is a network such as the Public Switched Telephone Network [PSTN], the Internet, etc. that carries a call from a telecommunications terminal (e.g., a telephone, a personal digital assistant [PDA], etc.) to private branch exchange 110. A call might be a conventional voice telephone call, a text-based instant messaging (IM) session, a Voice over Internet Protocol (VoIP) call, etc.

Private branch exchange (PBX) 110 receives incoming calls from telecommunications network 105 and directs the calls to interactive voice response (IVR) system 120 or to one of a plurality of telecommunications terminals within the enterprise, depending on how private branch exchange 110 is programmed or configured. For example, in an enterprise call center, private branch exchange 110 might comprise logic for routing calls to service agents' terminals based on criteria such as how busy various service agents have been in a recent time interval, the telephone number called, and so forth. In addition, private branch exchange 110 might be programmed or configured so that an incoming call is initially routed to interactive voice response (IVR) system 120, and, based on caller input to IVR system 120, subsequently redirected back to PBX 110 for routing to an appropriate telecommunications terminal within the enterprise. Private branch exchange (PBX) 110 also receives outbound signals from telecommunications terminals within the enterprise and from interactive voice response (IVR) system 120, and transmits the signals on to telecommunications network 105 for delivery to a caller's terminal.

Interactive voice response (IVR) system 120 is a data-processing system that presents one or more menus to a caller and receives caller input (e.g., speech signals, keypad input, etc.), as described above, via private branch exchange 110. Interactive voice response system (IVR) 120 is typically programmable and performs its tasks by executing one or more instances of an IVR system application. An IVR system application typically comprises one or more scripts that specify what speech is generated by interactive voice response system 120, what input to collect from the caller, and what actions to take in response to caller input. For example, an IVR system application might comprise a top-level script that presents a main menu to the caller, and additional scripts that correspond to each of the menu options (e.g., a script for reviewing bank account balances, a script for making a transfer of funds between accounts, etc.).

A popular language for such scripts is the Voice extensible Markup Language (abbreviated VoiceXML or VXML). The Voice extensible Markup Language is an application of the extensible Markup Language, abbreviated XML, which enables the creation of customized tags for defining, transmitting, validating, and interpretation of data between two applications, organizations, etc. The Voice extensible Markup Language enables dialogs that feature synthesized speech, digitized audio, recognition of spoken and keyed input, recording of spoken input, and telephony. A primary objective of VXML is to bring the advantages of web-based development and content delivery to interactive voice response system applications.

FIG. 2 depicts an exemplary Voice extensible Markup Language (VXML) script (also known as a VXML document or page), in accordance with the prior art. The VXML script, when executed by interactive voice response system 120, presents a menu with three options; the first option is for transferring the call to the sales department, the second option is for transferring the call to the marketing department, and the third option is for transferring the call to the customer support department. Audio content (in particular, synthesized speech) that corresponds to text between the <prompt> and </prompt> tags is generated by interactive voice response system 120 and transmitted to the caller.

The VXML script of FIG. 2 also comprises two event handlers. An event can be generated when a caller provides input (e.g., speech, keypad entry, etc.) in response to a prompt from the VXML script, or when there is a prompt timeout (i.e., the caller does not provide any input for a specified time period after a prompt). The first event handler of the VXML script catches and processes events of type telephone.disconnected.hangup, which are generated when a caller hangs up, and the second event handler catches and processes events of type nomatch, which are generated when a caller's input does not match any of a menu's choices.

Another popular standard for IVR system application scripts is Speech Application Language Tags (SALT). FIG. 3 depicts an exemplary XML script of the prior art that contains Speech Application Language Tags (SALT) and provides functionality similar to the VXML script of FIG. 2.

SUMMARY OF THE INVENTION

As video displays become ubiquitous in telecommunications terminals, it can be advantageous to deliver video content to a telecommunications terminal during a call with an interactive voice response (IVR) system, in addition to audio content. For example, a user of a telecommunications terminal who is ordering apparel via an IVR system might receive a video content stream related to a particular item (e.g., depicting a model who is wearing the item, depicting the different available colors for the item, etc.). Furthermore, in some instances it might be desirable to deliver an audio content stream (e.g., music, news, etc.) to the user, perhaps during silent periods in the call, or perhaps as background audio throughout the entire call.

When a content stream (whether video, audio, or both) is delivered to a telecommunications terminal during a call with an IVR system, a variety of events related to the content stream can occur, such as: completion of playback of the content stream; user control of the content stream (e.g., pause, stop, fast forward, etc.); a drop-off in quality of service (QoS) for the content stream (e.g., due to network congestion, etc.); and so forth. It would be advantageous if an IVR system script were made aware of when such events occur, and were capable of responding accordingly (e.g., stopping playback of a content stream, queuing another content stream, etc.) without interfering with the other tasks of the IVR system script (e.g., collecting input from the caller, etc.).

In the illustrative embodiment of the present invention, the IVR system generates an asynchronous event when there is a content stream-related occurrence during a call, and the asynchronous event is caught by an appropriate event handler within the IVR system script. The event handler then spawns a separate thread that handles the event accordingly and executes in parallel with the IVR system script (i.e., the IVR system script continues handling the call while the thread executes).

The present invention overcomes two disadvantages of the prior art to enable an IVR system script to handle content stream-related events. First, the present invention enables events to be generated and caught by an IVR system script at any time during a call. In contrast, in the prior art an event can be generated and caught in an IVR system script only when either (i) a caller provides input in response to a prompt from the IVR system script, or (ii) a prompt timeout occurs. Second, because the present invention enables events to be handled in parallel with the execution of an IVR system script, appropriate actions can be performed in response to a stream-related event without halting or interfering with other tasks of the script.

The illustrated embodiment comprises: receiving a signal at an interactive voice response system during a call that involves the interactive voice response system and a telecommunications terminal, wherein the signal is associated with a content stream that is delivered to the telecommunications terminal during the call, and wherein the interactive voice response system executes an application to handle the call; and performing an action at the interactive voice response system in response to the signal; wherein the performing of the action is concurrent with the execution of the application.

BRIEF DESCRIPTION OF THE DRAWINGS

FIG. 2 depicts an exemplary Voice extensible Markup Language (VXML) script, in accordance with the prior art.

FIG. 3 depicts an exemplary markup-language script that contains Speech Application Language Tags (SALT), in accordance with the prior art.

FIG. 6 depicts an exemplary Voice extensible Markup Language (VXML) script, in accordance with the illustrative embodiment of the present invention.

FIG. 7 depicts an exemplary markup-language script that contains Speech Application Language Tags (SALT), in accordance with the illustrative embodiment of the present invention.

DETAILED DESCRIPTION

Figure 1:
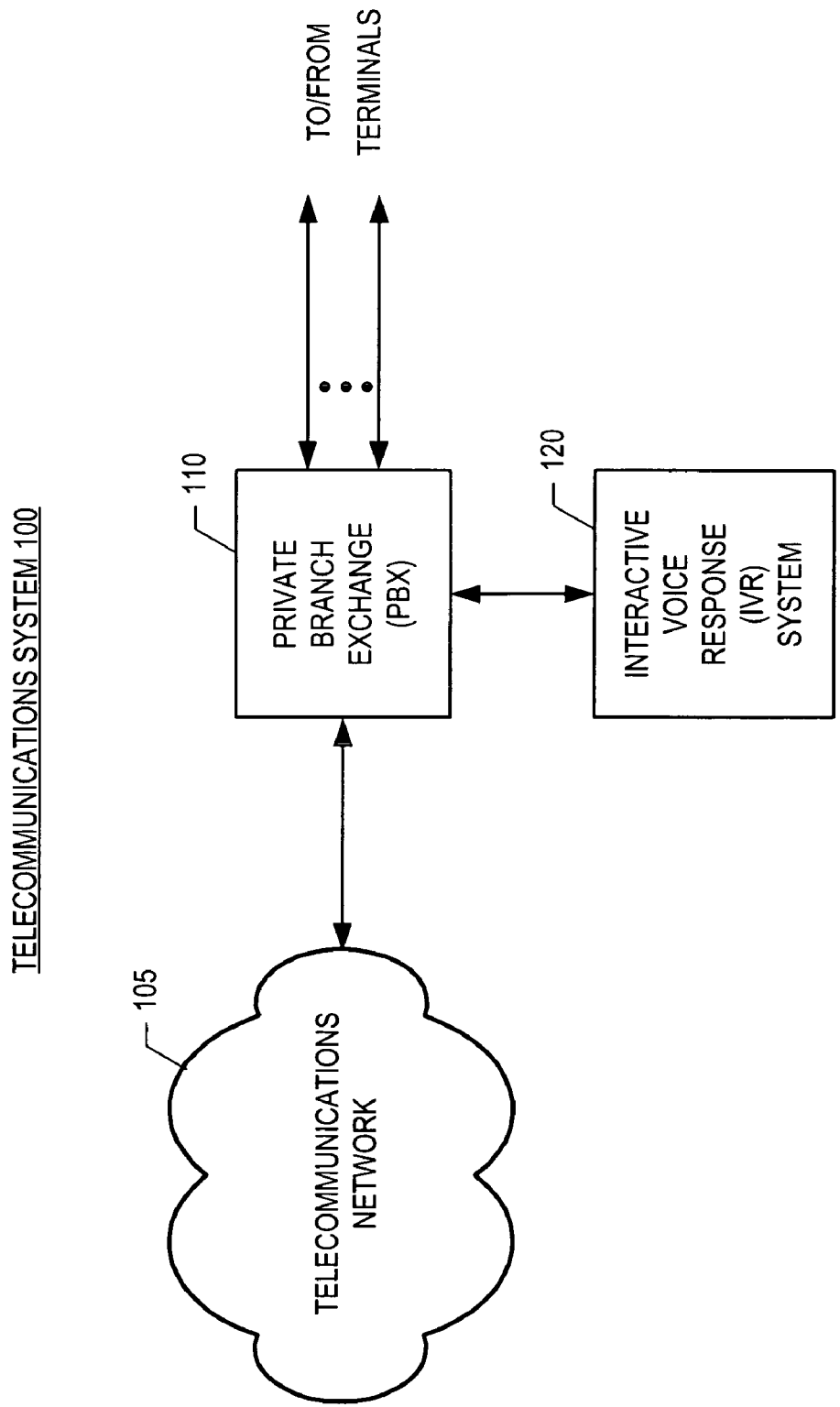
FIG. 1 depicts telecommunications system 100 in accordance with the prior art.
Figure 4:
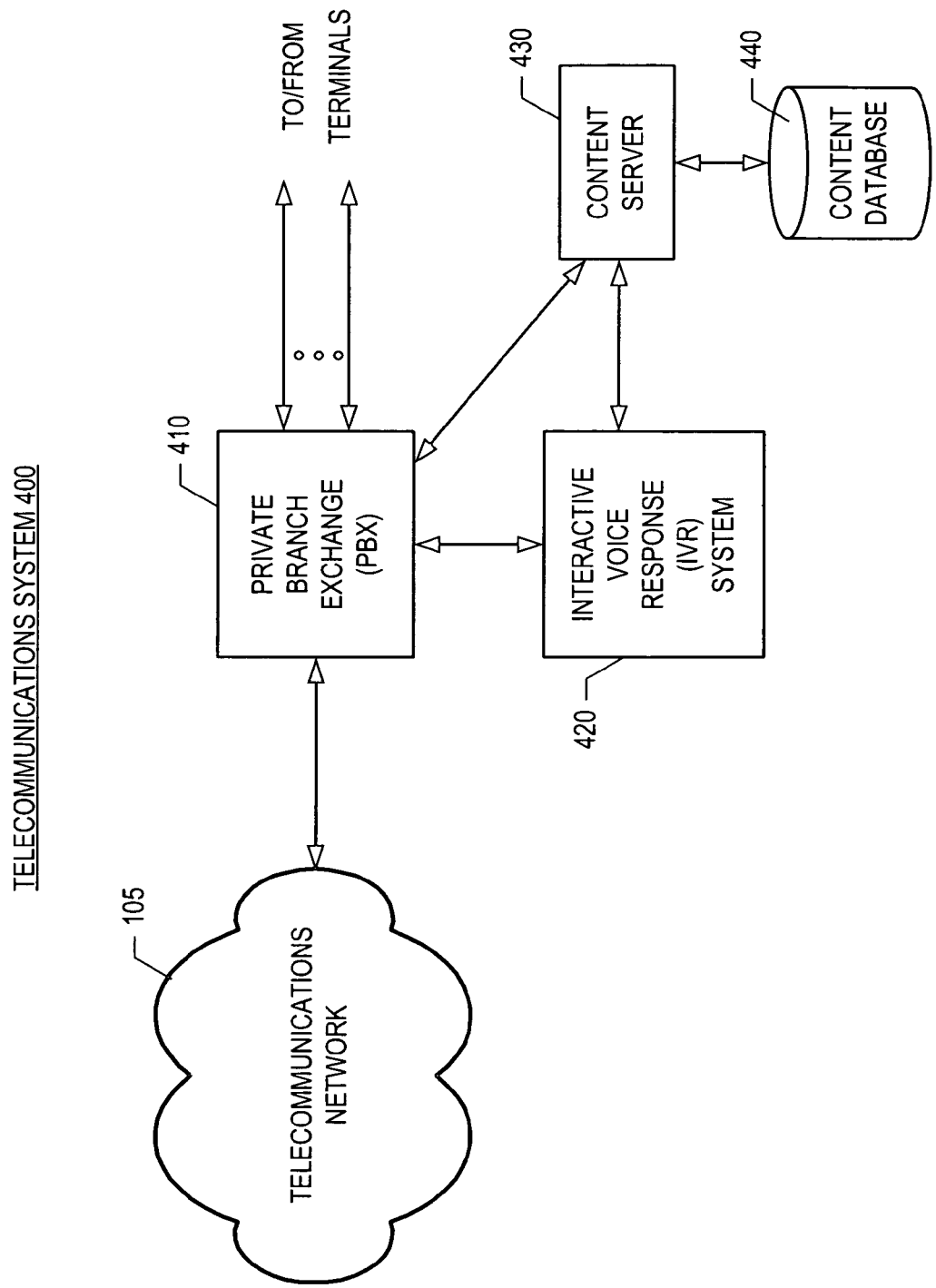
FIG. 4 depicts telecommunications system 400 in accordance with the illustrative embodiment of the present invention.

FIG. 4 depicts telecommunications system 400 in accordance with the illustrative embodiment of the present invention. Telecommunications system 400 comprises telecommunications network 105, private branch exchange (PBX) 410, interactive voice response system 420, content server 430, and content database 440, interconnected as shown.

Private branch exchange (PBX) 410 provides all the functionality of private branch exchange (PBX) 110 of the prior art, and is also capable of receiving streamed content (e.g., audio, video, multimedia, etc.) from content server 430, of forwarding streamed content on to telecommunications network 105 for delivery to a caller's terminal, and of transmitting signals related to streamed content to content server 430. Furthermore, in addition to conventional telephony-based signaling and voice signals, private branch exchange 410 is also capable of transmitting and receiving Internet Protocol (IP) data packets, Session Initiation Protocol (SIP) messages, Voice over IP (VoIP) traffic, and stream-related messages (e.g., Real Time Streaming Protocol [RTSP] messages, etc.) to and from IVR system 420. It will be clear to those skilled in the art, after reading this specification, how to make and use private branch exchange (PBX) 410.

Interactive voice response system 420 provides all the functionality of interactive voice response system 120 of the prior art, and is also capable of transmitting commands to content server 430 (e.g., starting playback of a content stream, stopping playback of the content stream, queuing another content stream, etc.) and of receiving information from content server 430 (e.g., an indication that playback of a content stream has begun, an indication that playback of a content stream has completed, etc.). It will be clear to those skilled in the art, after reading this specification, how to make and use interactive voice response system 420.

Content server 430 is capable of retrieving content from content database 440, of buffering and delivering a content stream to a calling terminal via private branch exchange 410, of receiving commands from interactive voice response (IVR) system 410 (e.g., to start playback of a content stream, to queue another content stream, etc.), and of transmitting status information to interactive voice response (IVR) system 410, in well-known fashion. It will be clear to those skilled in the art, after reading this specification, how to make and use content server 430.

Content database 440 is capable of storing a plurality of multimedia content (e.g., video content, audio content, etc.) and of retrieving content in response to commands from content server 430, in well-known fashion. It will be clear to those skilled in the art, after reading this specification, how to make and use content database 440.

Figure 5:
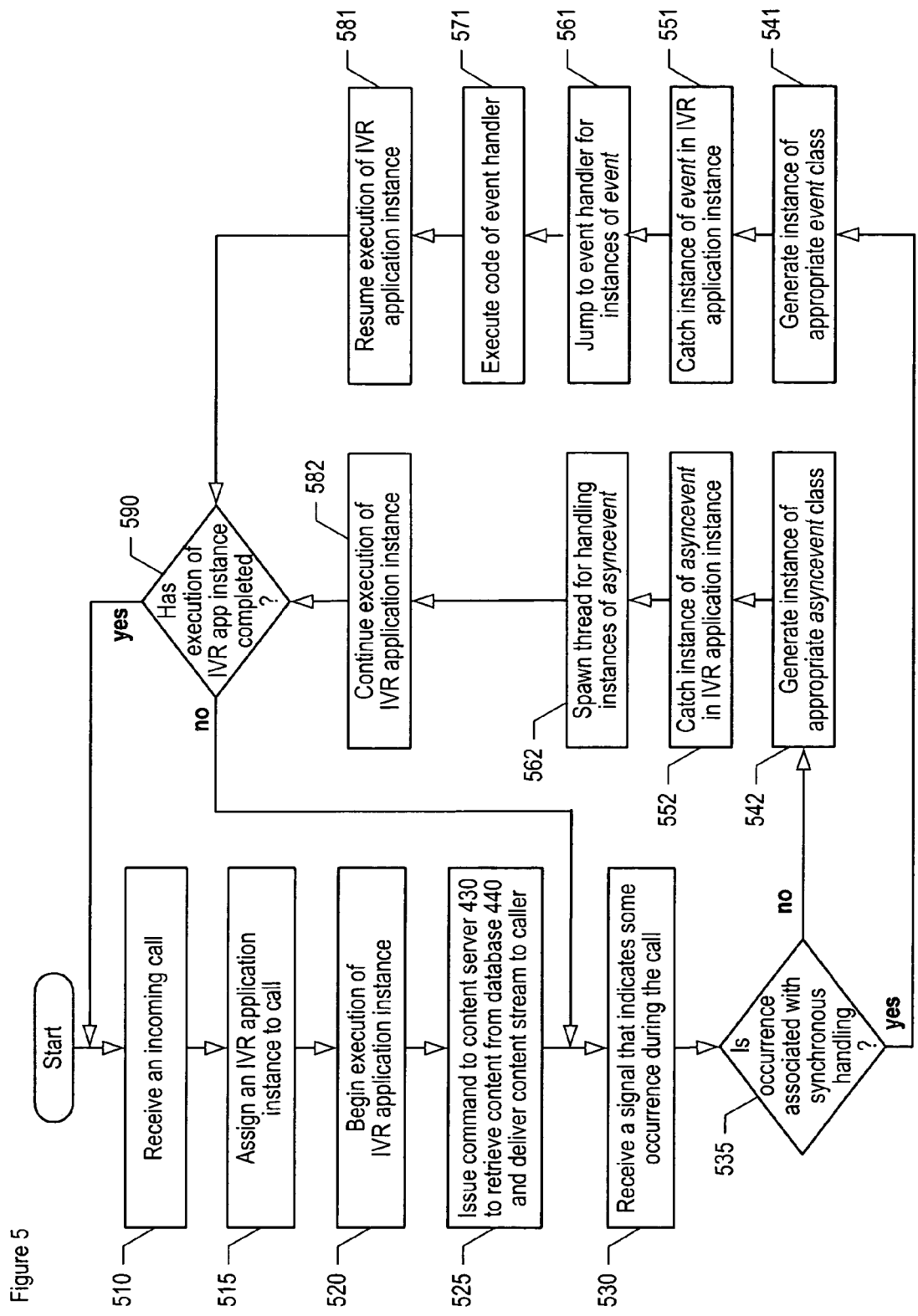
FIG. 5 depicts a flowchart of the salient tasks of interactive voice response system 420, in accordance with the illustrative embodiment of the present invention.

FIG. 5 depicts a flowchart of the salient tasks of interactive voice response (IVR) system 420, in accordance with the illustrative embodiment of the present invention.

At task 510, an incoming call is received at interactive voice response system 420, in well-known fashion.

At task 515, interactive voice response (IVR) system 420 assigns an instance of an appropriate IVR system application to the incoming call, in well-known fashion. As will be appreciated by those skilled in the art, although in the illustrative embodiment an instance of an IVR system application handles one incoming call at a time, in some other embodiments of the present invention an application instance might handle a plurality of calls concurrently.

At task 520, interactive voice response (IVR) system 420 begins executing the IVR application instance, in well-known fashion.

At task 525, interactive voice response (IVR) system 420 issues a command to content server 430 to retrieve content from database 440 and deliver the content to the caller in streaming fashion, as is well-known in the art.

At task 530, interactive voice response (IVR) system 420 receives a signal that indicates some occurrence during the call, in well-known fashion. Note that the term "occurrence" is used to distinguish from a software "event" object.

At task 535, interactive voice response (IVR) system 420 checks whether the particular occurrence is of a type that is associated with synchronous handling, as in the prior art. If so, execution proceeds to task 541, otherwise execution proceeds to task 542.

At task 541, interactive voice response (IVR) system 420 generates an instance of the appropriate event class, in accordance with the prior art.

At task 551, the IVR application instance catches the event instance generated at task 541, in accordance with the prior art.

At task 561, the IVR application instance jumps to the appropriate event handler for instances of event, in accordance with the prior art.

At task 571, the IVR application instance executes the code of the event handler, in accordance with the prior art.

At task 581, the IVR application instance resumes execution at the appropriate line of code, in accordance with the prior art.

At task 542, interactive voice response (IVR) system 420 generates an instance of an asyncevent class that corresponds to the occurence. The asyncevent class is a new class that is defined in the illustrative embodiment and corresponds to events that are associated with asynchronous handling (e.g., content stream-related events, etc.). All such events are represented by subclasses of asyncevent, such as media.client.video.playdone, media.network.congestion, and so forth.

At task 552, the IVR application instance catches the asyncevent instance generated at task 551, in well-known fashion.

At task 562, the IVR application instance spawns a thread for handling the asyncevent instance, in well-known fashion. The thread is a child thread in that it cannot interfere with the execution of the IVR application instance, and it terminates when the IVR application instance terminates.

At task 582, the IVR application instance continues its execution, in well-known fashion.

Task 590 checks whether execution of the IVR application instance has completed. If so, execution continues back at task 510 for the next incoming call; otherwise, execution continues back at task 530 for handling a subsequent event during the current call.

FIG. 6 depicts an exemplary Voice Extensible Markup Language (VXML) script, in accordance with the illustrative embodiment of the present invention. The script is the same as the script of FIG. 2 of the prior art, with the addition of lines of code depicted in boldface. As shown in FIG. 6, the script now contains two additional event handlers for two types of asyncevents: media.network.congestion, and media.client.video.playdone. In events of the former type, the current video content stream is stopped by proceeding to the VXML script at Uniform Resource Locator (URL) "http://videoserver/stopMedia". In events of the latter type, the appropriate processing is performed by the script at URL "http://videoserver/stopMedia".

FIG. 7 depicts an exemplary markup-language script that contains Speech Application Language Tags (SALT), in accordance with the illustrative embodiment of the present invention. The script is the same as the script of FIG. 3 of the prior art, with the addition of lines of code depicted in boldface. As shown in FIG. 7, the script now contains a command to initiate playback of a video stream associated with Uniform Resource Locator (URL) "http://videoserver/playintro.3gp", and additional event handlers for handling the completion of playback of the current video stream, network congestion, and video prompt errors.

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the specification to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed is:

1. A method comprising:
receiving a signal at an interactive voice response system during a call that involves said interactive voice response system and a telecommunications terminal, wherein said signal is associated with a content stream that is delivered to said telecommunications terminal during said call, and wherein said interactive voice response system executes an application that is for prompting for and receiving one or more caller inputs unrelated to said content stream; and
in response to said signal performing, concurrently with the execution of said application, an action at said interactive voice response system that is related to said content stream.

2. The method of claim 1 further comprising:
generating at said interactive voice response system an event that is based on said signal; and
catching said event in said application of said interactive voice response system.

3. The method of claim 2 wherein the catching of said event and the performing of said action is specified by a script of said application that contains one or both of Voice eXtensible Markup Language and Speech Application Language Tags.

4. The method of claim 1 wherein the performing of said action is in a separate thread of said application.

5. The method of claim 1 wherein the performing of said action does not halt the prompting for and receiving of said one or more caller inputs unrelated to said content stream.

6. The method of claim 1 wherein said signal is a Session Initiation Protocol message that is sent by said telecommunications terminal.

7. The method of claim 1 wherein said signal comprises a command from the user of said telecommunications terminal for controlling playback of said content stream.

8. The method of claim 1 wherein said signal is received from a content server that delivers said content stream to said telecommunications terminal.

9. The method of claim 8 wherein said signal indicates one of: (i) the start of playback of said content stream, and (ii) the completion of playback of said content stream.

10. The method of claim 1 wherein said signal indicates that quality of service for said content stream is below a threshold.

11. The method of claim 1 wherein said signal specifies the current playback position of said content stream.

12. The method of claim 1 wherein said action is for one or both of: stopping said content stream, and queuing another content stream.

13. The method of claim 1 wherein said action comprises logging temporal information associated with playback of said content stream.

14. A method comprising:
catching an event in a script of an interactive voice response system, wherein said event is associated with a content stream that is delivered to a telecommunications terminal during a call that involves said telecommunications terminal and an interactive voice response system, and wherein said script is for prompting for and receiving one or more caller inputs unrelated to said content stream;
spawning a thread that performs an action related to said content stream in response to said event; and
interpreting one or more lines of code of said script during the execution of said thread.

15. The method of claim 14 wherein said event is associated with one of: (i) the start of playback of said content stream, and (ii) the completion of playback of said content stream.

16. The method of claim 14 wherein said event is associated with quality of service for said content stream.

17. The method of claim 14 wherein said event is associated with a user command for controlling playback of said content stream.

18. The method of claim 14 wherein said script contains one or both of Voice eXtensible Markup Language and Speech Application Language Tags.

* * * * *